March 9, 1943.  J. H. PRESSLEY  2,313,262
AUTOMATIC RECORD-CHANGING APPARATUS
Filed Jan. 22, 1941  6 Sheets-Sheet 1
FIG. 1
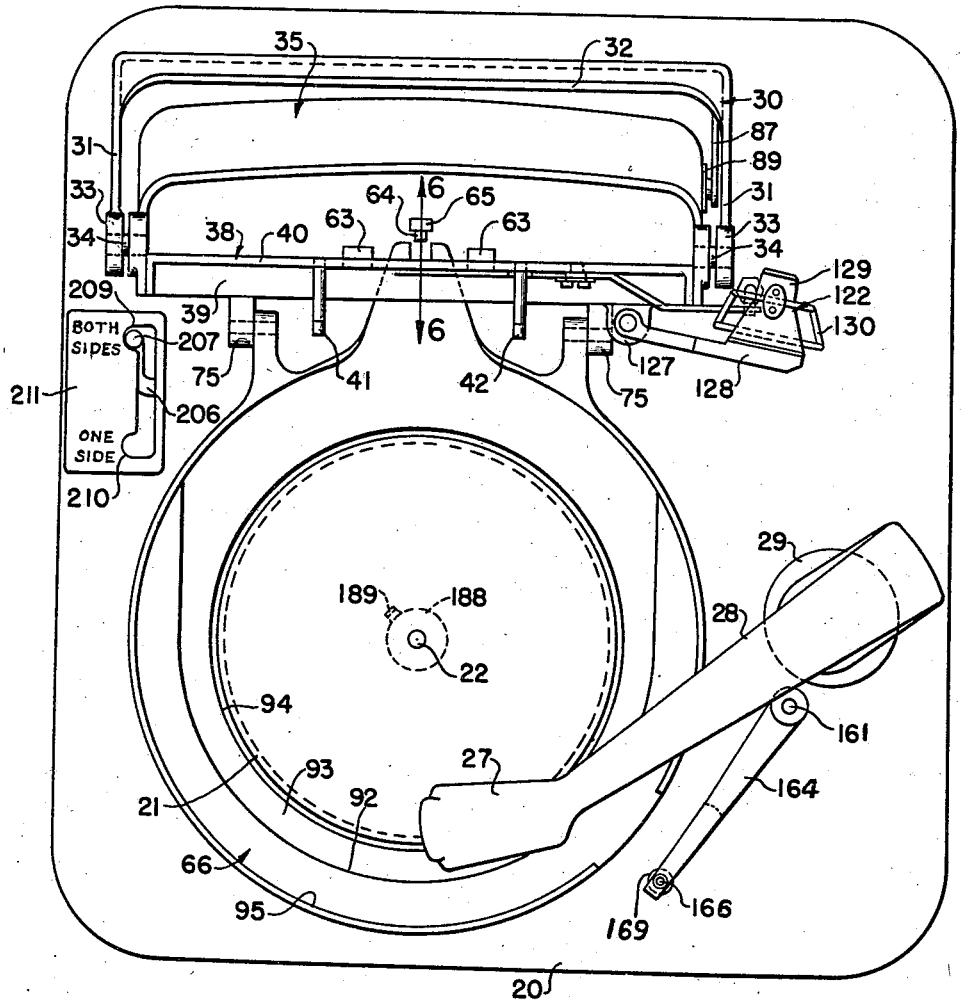
FIG. 6
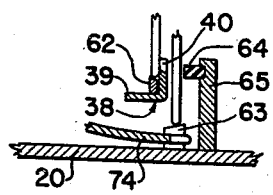
INVENTOR
JACKSON H. PRESSLEY
BY 
ATTORNEY March 9, 1943.　　　J. H. PRESSLEY　　　2,313,262
AUTOMATIC RECORD-CHANGING APPARATUS
Filed Jan. 22, 1941　　　6 Sheets-Sheet 2
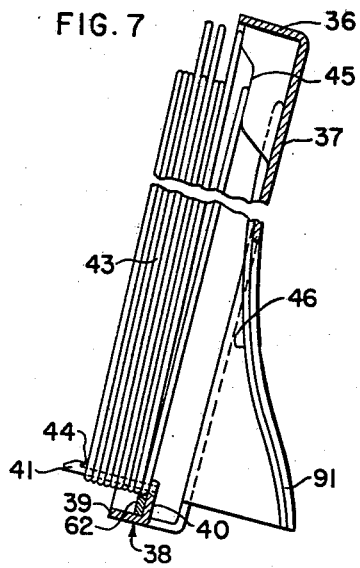
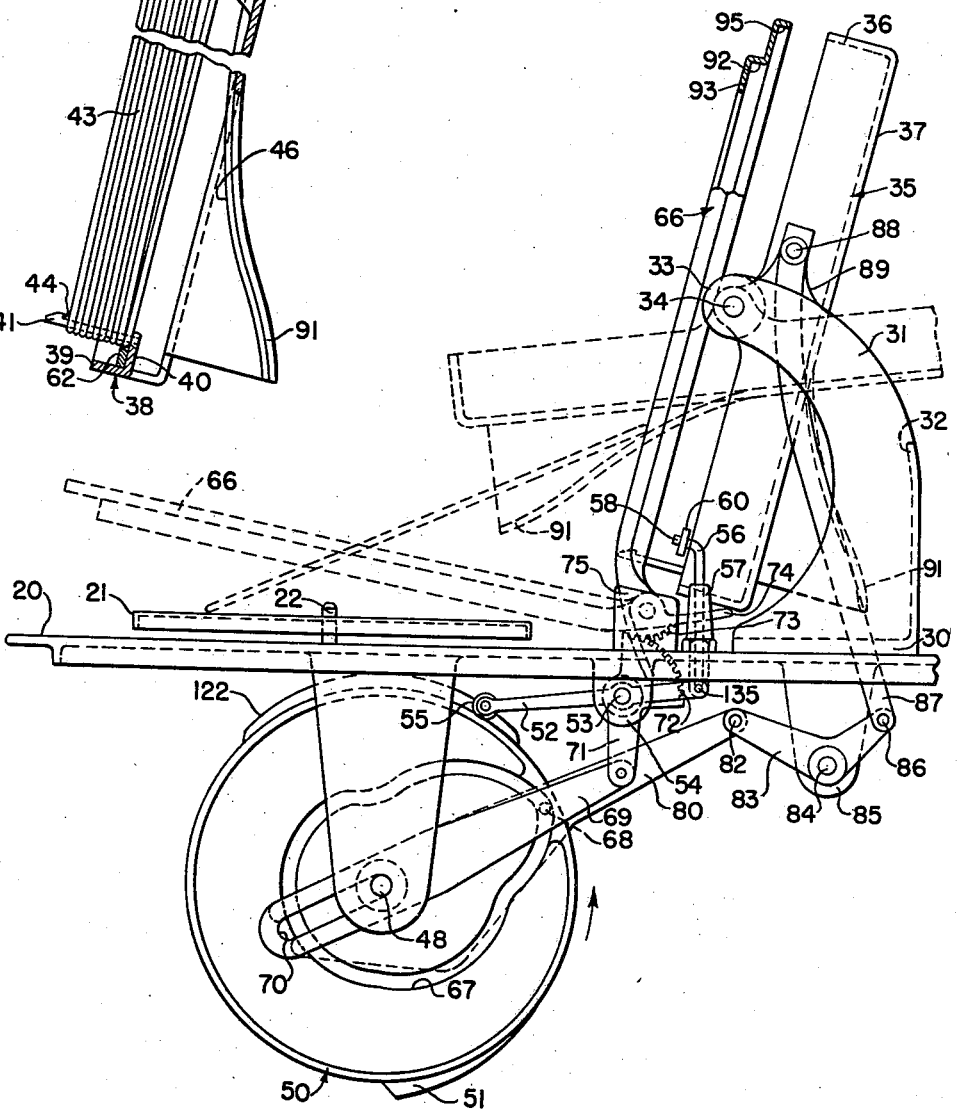
INVENTOR
JACKSON H. PRESSLEY March 9, 1943.   J. H. PRESSLEY   2,313,262
AUTOMATIC RECORD-CHANGING APPARATUS
Filed Jan. 22, 1941   6 Sheets-Sheet 3
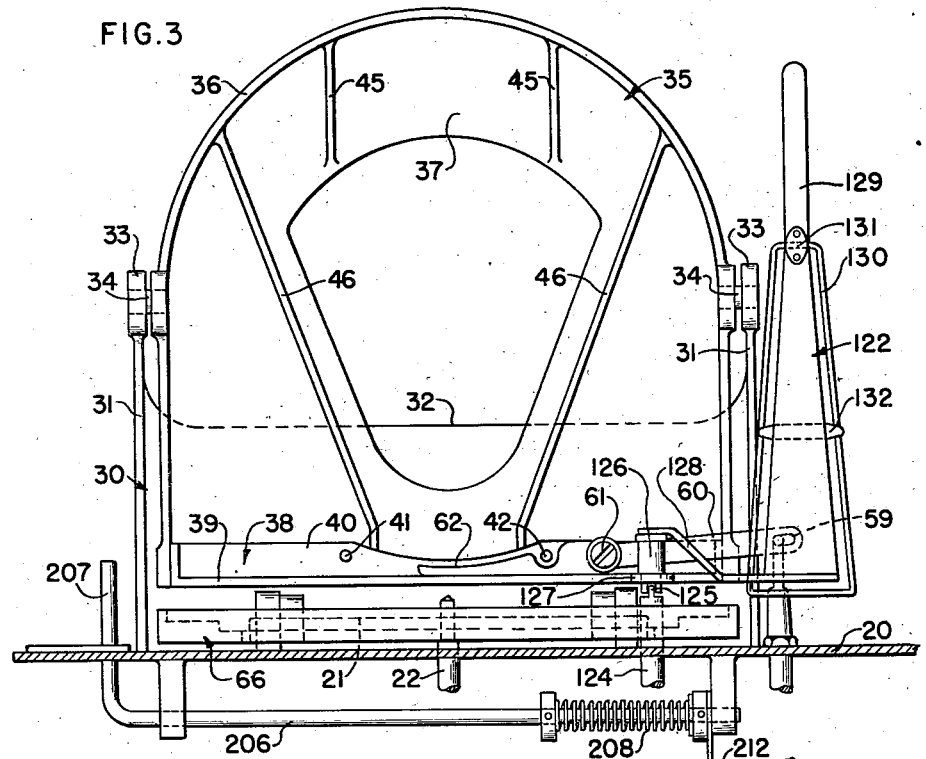
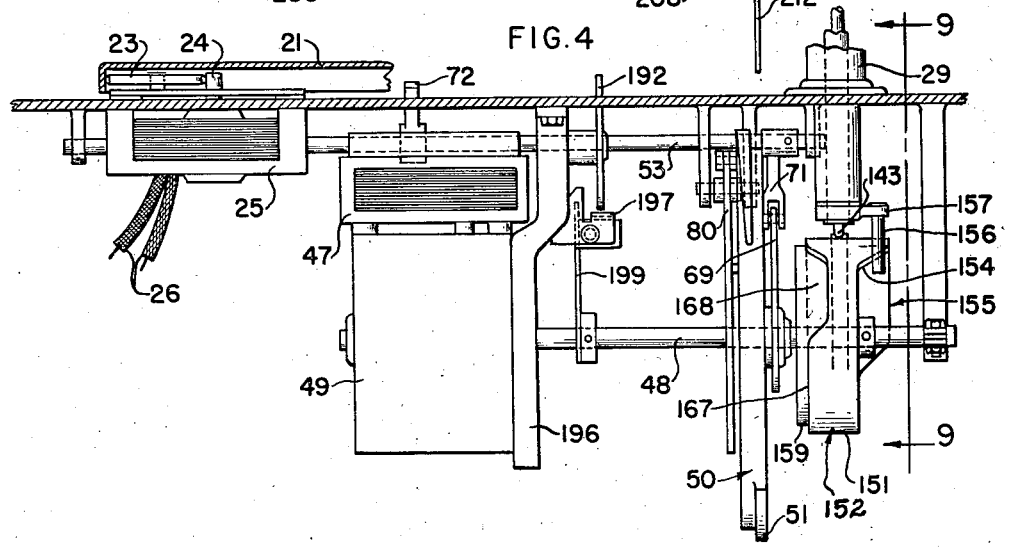
INVENTOR
JACKSON H. PRESSLEY
BY
ATTORNEY March 9, 1943.  J. H. PRESSLEY  2,313,262
AUTOMATIC RECORD-CHANGING APPARATUS
Filed Jan. 22, 1941  6 Sheets-Sheet 4

INVENTOR
JACKSON H. PRESSLEY
BY
ATTORNEY

March 9, 1943. J. H. PRESSLEY 2,313,262
AUTOMATIC RECORD-CHANGING APPARATUS
Filed Jan. 22, 1941 6 Sheets-Sheet 5
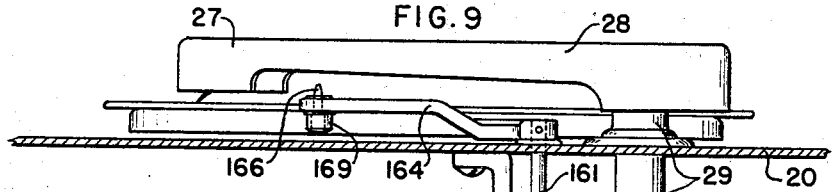
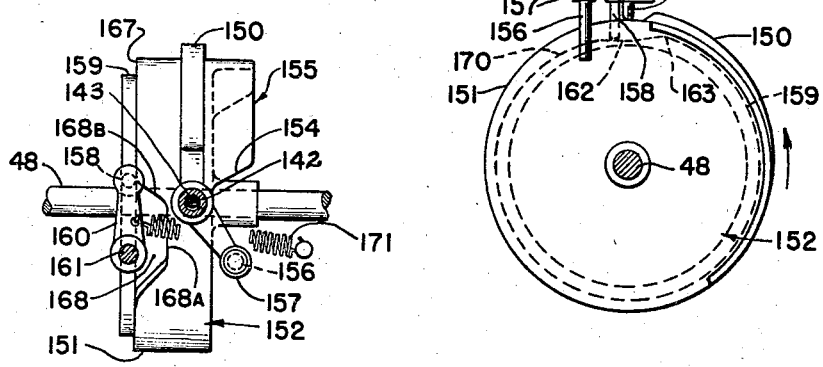
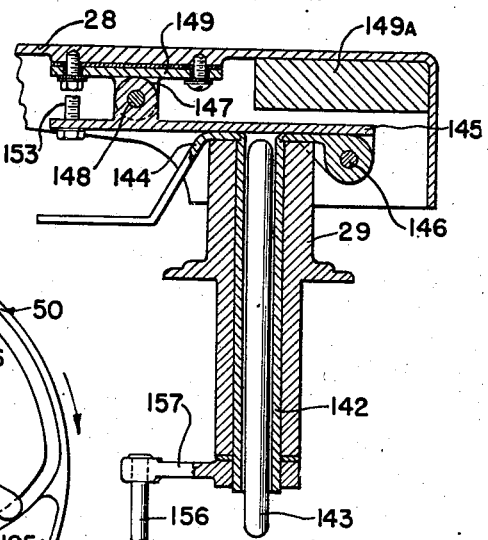
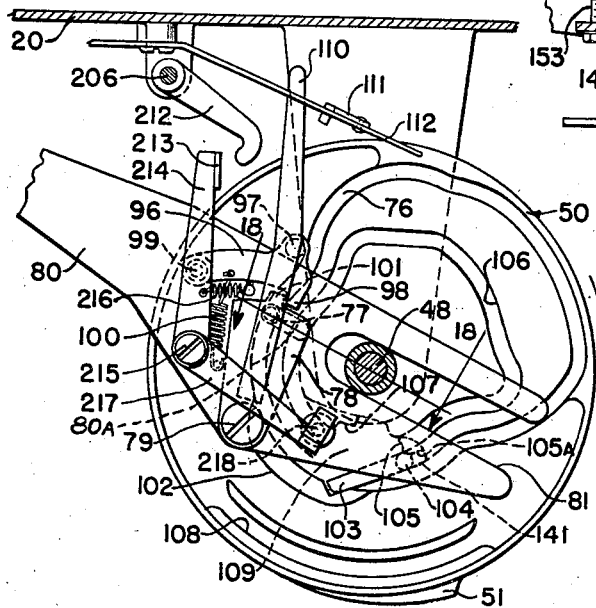
INVENTOR
JACKSON H. PRESSLEY
BY
ATTORNEY March 9, 1943.    J. H. PRESSLEY    2,313,262
AUTOMATIC RECORD-CHANGING APPARATUS
Filed Jan. 22, 1941    6 Sheets-Sheet 6
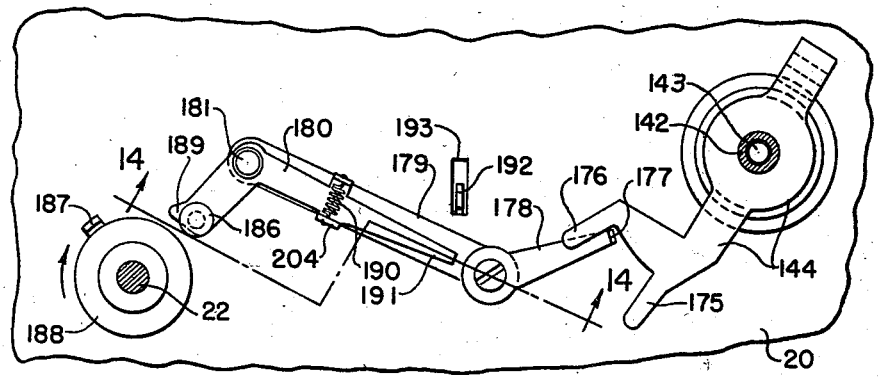
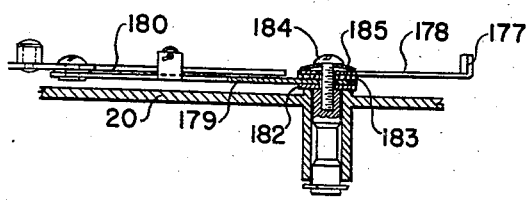
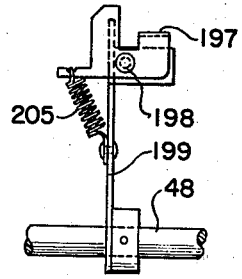
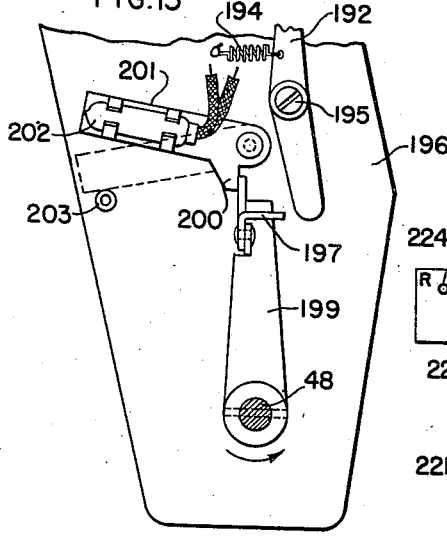
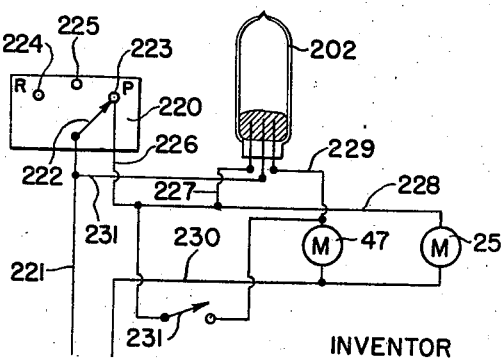
INVENTOR
JACKSON H. PRESSLEY
BY
ATTORNEY Patented Mar. 9, 1943

2,313,262

UNITED STATES PATENT OFFICE 2,313,262

AUTOMATIC RECORD-CHANGING APPARATUS

Jackson H. Pressley, Marion, Ind., assignor to Farnsworth Television and Radio Corporation, a corporation of Delaware Application January 22, 1941, Serial No. 375,389

9 Claims. (Cl. 274—10)

This invention relates to automatic record-changing apparatus, and more particularly to new and useful improvements embodied in such apparatus.

An object of the present invention is to provide an improved and simplified mechanism for controlling the movement of a magazine in an automatic record-changing apparatus.

A further object of the present invention is to provide an improved mechanism for controlling the movement of the pickup arm used with the record-changing apparatus so that the stylus of the reproducer engages a record on the turntable with the least possible force.

In accordance with the present invention, there is provided an automatic record-changing apparatus comprising a movable magazine, a cam wheel and a connecting means associated with the magazine. The connecting means has a member which cooperates with the magazine during a first cycle thereof whereby the magazine is moved over a predetermined distance. The cam wheel has a switching means which is adapted to change the cooperation of the member with the cam wheel so that during a second cycle of the cam wheel, the magazine is moved over a different predetermined distance.

In accordance with a further feature of this invention, there is provided a phonograph comprising a turntable, a pickup arm with a reproducer at one end thereof for cooperating with a record on the turntable, a supporting means for the pickup arm, cam means, and pickup arm control means. The pickup arm control means is associated with the cam means and is adapted to engage the pickup arm intermediate the reproducer and the supporting means for moving the reproducer into engagement with the outer groove of the record on the turntable.

For a better understanding of the invention, together with other and further objects thereof, reference is made to the following description taken in connection with the accompanying drawings, and its steps will be pointed out in the appended claims.

In the accompanying drawings:

Fig. 1 is a top plan view of the record-changing apparatus;

Fig. 2 is a side elevational view showing a partial assembly of the record-changing apparatus;

Fig. 3 is a front elevational view of the upper portion of the record-changing apparatus;

Fig. 4 is a front elevational view of the lower portion of the record-changing apparatus;

Fig. 6 is a detailed sectional view taken on line 6—6 of Fig. 1;

Fig. 7 is a vertical sectional view through the record magazine showing the location of the records therein;

Fig. 9 is a view taken on line 9—9 of Fig. 4, showing the mechanism for moving the pickup arm;

Fig. 10 is a fragmentary view showing the associated element for moving the pickup arm horizontally;

Fig. 11 is a sectional view showing the double pivotal support for the pickup arm;

Fig. 12 is a fragmentary view showing the side of the cam wheel with the cam grooves which control the pivotal movement of the magazine, and the mechanism for setting the record-changing apparatus to play one or both sides of a record;

Fig. 13 is a fragmentary view showing the tripping mechanism;

Fig. 14 is a partial sectional view taken on line 14—14 of Fig. 13, showing the clutch assembly of the tripping mechanism;

Fig. 15 is a fragmentary elevational view showing part of the mechanism for controlling the main drive motor switch; and Fig. 16 is a fragmentary elevational view showing another portion of the mechanism for controlling the main driving motor switch.

Fig. 17 is a circuit diagram, in schematic form, of a switching arrangement for controlling selectively the operation of the turntable and changer motors.

Figure 5:
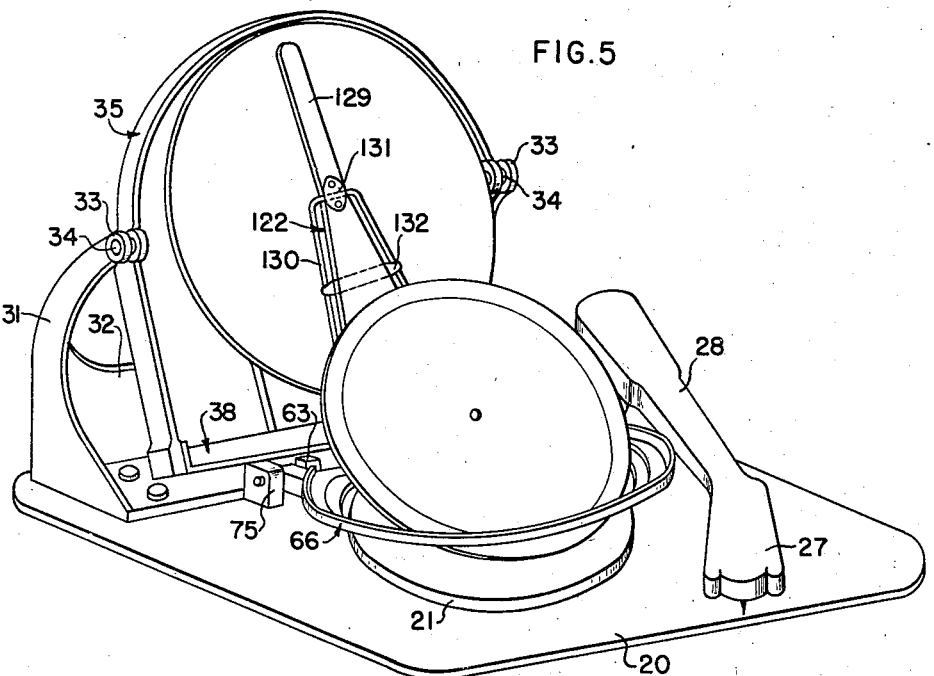
Fig. 5 is a perspective view of the upper portion of the record-changing apparatus shown in the act of reversing a record.

Referring particularly to Fig. 1 of the drawings, the invention is illustrated as having a base or supporting plate 20. Disposed above the base plate is a horizontally rotatable turntable 21 supported by a centering pin 22 journaled for rotation in a bearing provided in the base plate 20.

As shown in Fig. 4, the turntable 21 is driven by a wheel 23 which frictionally engages a shaft 24 of an electric motor 25. The electric motor 25 is supported by brackets depending below the base plate 20. Current is supplied to the motor from a suitable source through conductors 26.

A stylus of a reproducer 27 (Fig. 1) cooperates with a record moved to the turntable 21. The reproducer 27 is supported at the end of a pickup arm 28, the other end of which is pivoted on a pedestal 29. The pickup arm is so mounted as to permit its movement by automatic means which will be described in detail hereafter.

Means are provided for supporting a plurality of intermixed records. This means includes a bracket 30 (Figs. 1 and 3) fixedly secured to the base plate 20. The bracket 30 has a pair of upwardly curved spaced arms 31 connected by a web 32. The enlarged ends of the arms 31 provide bearings 33 (Figs. 1 and 3) for short shafts or studs 34 of a record magazine 35 (Figs. 2 and 3). The reservoir or magazine 35 is pivotally mounted in the bearings 33 for a swinging movement between the position shown in solid lines and the position shown in dotted lines in Fig. 2 of the drawings.

The magazine 35 includes a forwardly projecting flange 36 (Figs. 2 and 3), a back portion 37 and a lower cross-member 38 connecting the lower ends of the side portions of the flange 36. A sectional view of the cross-member 38 is shown in Figs. 6 and 7 of the drawings. It is apparent from these figures that the cross-member is angular in shape having a substantially horizontal portion 39 and a substantially vertical portion 40. Carried by the member 38 on the vertical portion 40, at points equally spaced from the center, are a pair of forwardly projecting pins 41 and 42 (Fig. 1) disposed to be engaged by the lower edges of a stack of records 43 to support the weight of the records in the magazine 35 as shown in Fig. 7. These pins may be notched near the ends at 44 to prevent the records from slipping off.

Formed on or secured to the back 37 of the magazine 35 are pairs of ribs 45 and 46 (Fig. 3). The rear record of the stack of records 43 will have its upper peripheral portion in engagement with the ribs 45 (Fig. 7) when the records are stored. The ribs 46 function in transferring a record from the magazine 35 to the turntable 21 as will be described hereafter.

Mechanism is provided for transferring records one at a time from the magazine 35 to the turntable 21. The mechanism is driven by an electric driving motor 47 which is connected to a shaft 48 by means of a speed reducer 49. The motor 47 and the speed reducer 49 are supported below the base plate 20 as shown in Fig. 4 of the drawings.

Secured to the shaft 48 is a large cam wheel 50 having in its sides cam tracks or grooves to be described later, and having on its periphery a cam 51 shown in Fig. 2, for operating a mechanism to chop or remove a record from the magazine 35. A lever 52 is pivoted intermediate its ends on a shaft 53 which is carried by a bracket 54 fixed below the base plate 20, Fig. 2. At one end, the lever 52 carries a roller 55 which is adapted to engage the cam 51 when it is desired to feed a record from the magazine 35 to the turntable 21.

The opposite end of the lever 52 is pivotally connected to an upwardly extended rod 56 (Fig. 2) passing through the base plate 20 and a guide 57 secured to the top surface of the base plate 20. At its upper end the rod 56 is bent forwardly and its forward portion 58 passes through an elongated opening 59 in a knife or chopping lever 60 shown in Fig. 3. This lever 60 is pivoted intermediate its ends at 61, to the cross-member 38 of the magazine 35.

The opposite end of the lever 60 (Fig. 3) extends between the supporting pins 41 and 42, and the end 62 of the lever 60 lies closely against the vertical portion 40 of the cross-member 38 as shown in Figs. 6 and 7. The upper surface of the end 62 of the lever 60 inclines downwardly toward the vertical portion 40 of the member 38 as is best shown in Fig. 6. The center portion of the vertical leg 40 of the member 38 is scooped out or cut away, as clearly shown in Fig. 3. The record in the magazine 35 which rests against the ribs 45 also rests on the portion 62 of the lever 60, and against the vertical leg 40 of the cross-member 38.

When the cam wheel 50 is rotated so that the cam 51 (Fig. 2) strikes the roller 55, the lever 52 is rocked on its pivot 53 drawing downwardly the rod 56. This in turn moves upwardly the end 62 of the lever 60. This movement of the lever 60 elevates the record resting on it, and slides the record downwardly out of the magazine. After this releasing operation, the released record rests on spaced cushioning pads or blocks 63 disposed on the base plate 20, shown in Figs. 1 and 6. In this position, the released record is held against rearward movement by a pad 64 on an upright 65, Figs. 1 and 6.

The next step is to move the record from the cushioning pads or blocks 63 to the turntable 21. This is accomplished by the cooperative movement of the magazine 35 and a pan 66.

The pan 66 is moved by the cam wheel 50 (Fig. 2) which is provided with a cam groove 67. Adapted to cooperate with the cam groove 67 is is a guiding pin 68 which is carried by an arm 69 with a slot 70 at its lower end. The shaft 48 passes through the slot 70. At the upper end of the arm 69 there is pivotally connected a lever 71 which is secured at its upper end to the shaft 53. Also secured to the shaft 53 is a segmental gear 72 spaced along the shaft 53 from the lever 71, as shown in Fig. 4, and having teeth in mesh with a segmental gear 73 formed on the under side of a rearwardly extended tongue or projection 74, of the record-carrying and guiding means or pan 66, shown in Fig. 2.

The pan 66 (Fig. 1) is pivotally mounted on bracket 75 projecting upwardly from the base plate 20. The pan 66 is adapted to be swung by the segmental gear 72 from the full line position of Fig. 2 to a position where the pan surrounds the turntable 21 and is below it. When a record has been released from the magazine onto the cushioning pads 63, the rearwardly extending tongue 74 of the pan 66 is disposed below these pads 63. As the pan 66 is swung downwardly on its bearings 75 toward the turntable, the tongue projection 74 swings upwardly between the pads 63, and engages the lower edge of the released record and elevates it.

As the pan 66 moves downwardly in cooperating to move the released record to the turntable, the magazine 35 is swung in the bearings 33 through an arc from the full line position to the dotted line position, shown by Fig. 2. This movement of the magazine is achieved by the rotation of the cam wheel 50. The cam wheel 50 has a cam groove 76 with which a pin 77 is adapted to cooperate. The pin 77 is affixed to a plate 78 which is pivotally mounted as at 79 on a sliding beam 80 (Fig. 12). At one end of the beam 80, there is provided a notched portion 81. This notched portion provides a means for slidably mounting the beam 80 on the shaft 48. At the upper end, the beam 80 is connected as at 82 to a bell-crank lever 83 which is pivotally mounted at 84 to a bracket 85 depending from the underside of the base plate 20 (Fig. 2). The opposite end of the bell-crank lever 83 is connected as at 86 to a link 87 which is connected at its upper end as at 88 to a bracket 89 fixedly secured to the magazine 35 (Figs. 1 and 2). Referring to Figs. 1 and 2, it will be apparent that the bracket 89 is disposed on the magazine 35 rearwardly of the pivot studs 34, and that when the beam 80 is moved upwardly by engagement of the pin 77 in the cam groove 76, the bell-crank lever 83 will be rocked in a clockwise direction. As the bell-crank lever rocks, it will operate through the link 87 and pivot the magazine 35.

The magazine 35 is pivoted shortly after the tongue 74 of the pan 66 (Fig. 2) has engaged and moved the released record from the pads 63. The rear portion or back 37 of the magazine 35 flares outwardly as at 91 (Figs. 2 and 7). The upper portion of the released record is, of course, in contact with the back 37 of the magazine before it is moved to the turntable.

As the pan 66 is swung downwardly in the manner heretofore described, the record slides forwardly on the pan 66. The movement of the magazine 35 assists in the forward movement of the record, one edge of which is elevated and resting against the magazine and the other edge of which extends through the pan 66, engaging and sliding across the surface of the turntable. During the record-changing process, the turntable rotates but the record is held from lateral movement by the inner edge of the pan 66.

If the record being moved to the turntable is a ten-inch record, its forward edge will engage against a vertical wall 92 of the pan 66 (Figs. 1 and 2), and its forward movement will be stopped. By this time, the cam wheel 50 will have rotated a half revolution. As it continues to rotate, the pin 77 in following the cam track 76, will cause the beam 80 (Fig. 2) to move downwardly. When the beam 80 moves in this manner, the magazine 35, through the levers 83 and 87, is moved back to the full-line position, shown in Fig. 2. During the return movement of the magazine 35, the rear edge of the record slides down over the ribs 46 (Figs. 3 and 7) and is gradually lowered and properly centered in playing position on the turntable 21.

It is to be noted that the edge of the record first comes into engagement with the turntable on the opposite side of the centering pin 22 so that the record is not hindered in its sliding movement. Further, the turntable is covered with a suitable material to permit sliding a record across it, but at the same time having sufficient traction so that a record maintains a fixed position when it is being played.

The pan 66 is designed to accommodate records of different sizes. With this in view, the pan is provided in one plane with an annular portion 93 having a center opening defined by the line 94. The central opening is of slightly greater diameter than the diameter of the turntable 21. This is apparent from Fig. 1. The turntable is of a smaller diameter than the smallest record to be used. The arc defined by the wall 92 has a radius equal to the radius of a ten-inch record.

When a twelve-inch record is released from the magazine 35, and is moved into playing position upon the turntable, in the same manner as previously described for a ten-inch record, it jumps over the wall 92, owing to its greater diameter, and its forward edge contacts a wall 95 of the pan 66 (Figs. 1 and 2). The inner circumference of the wall 95 has a radius equal to the radius of a twelve-inch record. This wall 95 limits the forward movement of a twelve-inch record, and as the magazine 35 is swung back to the full-line position of Fig. 2, in the manner previously described, the twelve-inch record is let down and properly centered on the turntable 21.

The magazine 35 is also moved to cooperate in reversing a record on the turntable 21. This movement of the magazine 35 is different from its movement when it cooperates to move a released record to the turntable. The different movement of the magazine 35 is achieved by switching the pin 77 so that it cooperates in a different manner with the cam wheel 50. The mechanism for unlocking and switching the pin 77 includes a lever 96 with a roller 97 and a hooked end 98 and which is pivotally mounted on a pin 99 provided on the beam 80. A spring 100 maintains the hooked end 98 of the lever 96 in engagement with an ear 101 of the plate 78 during the time that the pin 77 is out of the common cam area 109. Just before the pin 77 enters the common cam area 109 at the beginning of a record-reversing cycle, a cam surface 102, which is provided on the cam wheel 50, moves into engagement with the roller 97 and pivots the lever 96 against the biasing action of the spring 100 so that the hooked end 98 is moved out of engagement with the ear 101 provided on the plate 78. Immediately thereafter, the left end of a member 103 (Fig. 12), which is pivotally mounted on the cam wheel 50 at 104 comes into contact with the pin 77. The member 103 is connected to the cam wheel 50 so that it is not free to move relative to the cam wheel 50 unless moved by some member. As the member 103 continues to move with the cam wheel 50 while in contact with the pin 77, the pin comes into engagement with a hooked end 105 of the member 103 and pivots the member 103. The pivotal movement of the member 103 places it in a position so that the left end of the member 103 is in engagement with a stop 107 and the hooked end 105 is in a position not to obstruct the cam groove 106. After the pivotal movement of the member 103 the pin 77 moves unobstructed in the cam groove 106. As will be seen from Figs. 12 and 18, during the time the pin 77 is switched from the groove 76 to the groove 106, the plate 78 and the pin 77 change their position relative to the beam 80. This is permitted by a slot 80A in the beam 80. After the pin 77 enters the cam groove 106, the cam surface 102 moves out of operating relationship with the roller 97. This permits the spring 100 to move the lever 96 into engagement with the plate 78 so that the right side (Fig. 12) of the hook 98 engages the left side (Fig. 12) of the ear 101. With the plate 78 locked in this position, the pin fixed thereto is guided by the cam groove 106.

During the time when the pin 77 is in engagement with the member 103 and is in area 109 of the cam wheel 50, the pin 99 is in engagement and follows the cam groove 108, provided on the cam wheel 50 (Fig. 12). While the pin 99 is in engagement with the cam groove 108, the beam 80 is prevented from moving to transmit motion to the magazine 35.

During the time that the pin 77 is in the area 109 and its position is changed from following the cam groove 76 to that of following the cam groove 106, the pin 77 moves the plate 78 and a finger 110 affixed thereto in a clockwise direction. In its clockwise movement, the finger 110 engages a spring-biased plate 111 fixed to a lever 112 to move the lever 112 in a counterclockwise direction.

Figure 8:
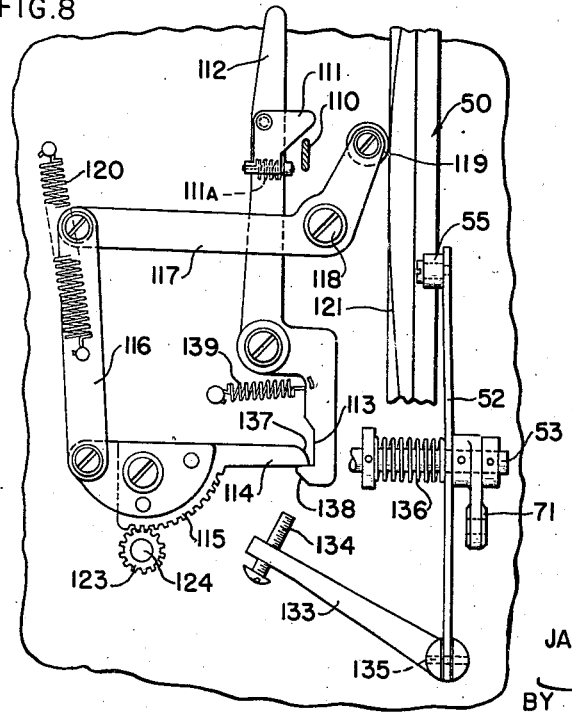
Fig. 8 is a fragmentary view showing the locking mechanism for the record-reversing member and the mechanism for placing the record-releasing device out of operative position.

When the lever 112, which is mounted pivotally to the base plate 20, is moved in a counterclockwise direction (Fig. 8), a notched end 113 of the lever 112 moves out of engagement with a finger 114 provided on a segmental gear 115 which is mounted to rotate on the bottom of the base plate 20. A link 116 connects the segmental gear 115 and an L-shaped lever 117, as shown in Fig. 8. Lever 117 is mounted at 118 to pivot beneath the base plate 20 and it supports at its free end a roller 119. A spring 120, having one end anchored at the base plate 20 and the other end anchored to the link 116, moves the segmental gear 115 and the lever 117 in a clockwise direction when finger 114 and the lever 112 are disengaged. But since the roller 119 on the end of the lever 117 is in engagement with the cam surface 121 on the cam wheel 50, this clockwise movement of the lever 117 and the segmental gear 115 is limited by the shape of the cam surface 121.

The clockwise movement of the segmental gear 115, as just described, serves two purposes. It actuates the mechanism for swinging a reversing member 122 from the position shown in Fig. 3 to the position shown in Fig. 5. It also moves the lever 52 (Figs. 2 and 8) out of operating position with the cam surface 51 of the cam wheel 50 so that the record-releasing lever 60 (Fig. 3) will not be operated during the record-reversing cycle.

The clockwise movement of the segmental gear 115 moves the reversing member 122 in front of the magazine by engaging and moving in a counterclockwise direction a pinion 123, which is affixed to a shaft 124 extending through the base plate 20. At the upper end of the shaft 124, there is formed a lug 125 (Fig. 3). This lug 125 enters a notch provided in the lower end of a stud 126 journaled in a bearing 127 (Figs. 1 and 3) provided on the magazine 35. To the upper end of the stud 126 is secured an arm 128 offset downwardly, as shown in Fig. 3. At its free end, the arm 128 carries the reversing member 122. The reversing member includes a flexible plate 129 to which is affixed a spring frame member 130 by the connection 131 and a spring plate 132. The lower end of the spring-frame member 130 is free of the flexible plate 129 and normally is set forwardly thereof. When the clockwise movement of the segmental gear 115 rotates the pinion 123, the shaft 124, affixed thereto, is also rotated to swing the reversing member 122 from the position shown in Fig. 3 to the position shown in Fig. 5.

The clockwise movement of the segmental gear 115 also moves out of operating relationship the mechanism for moving the record-releasing member 60 which is fixed to the upper end of the rod 56. At the lower end of the rod 56 there is affixed one end of an arm 133. The other end of the arm 33 is provided with an adjustable screw 134, which normally is maintained in the path of the finger 114 which moves with the segmental gear 115. The rod 56 also has connected to the lower end thereof by a pin 135 the lever 52 as shown in Fig. 8. Intermediate its ends, the lever 52 is constructed for mounting on the shaft 53 to slide along the axis thereof and to pivot in a vertical plane on the shaft 53. The spring 136 fixed to the shaft 53 maintains a lever 52 normally in a position so that the roller on the opposite end of the lever 52 is in the path of the cam portion 51 of the cam wheel 50.

When the segmental gear 115 is rotated in a clockwise direction, it moves therewith the finger 114. The finger 114 engages the screw 134 to move the arm 133 and therewith the rod 56 and the lever 52 in a counterclockwise direction about the axis of the rod 56. The counterclockwise movement of the lever 52 is against the tension of the spring 136, and it moves the roller out of the path of the cam portion 51. Thus on the next revolution of the cam wheel 50, the cam portion 51 does not engage the roller 55 to pivot in a vertical plane on the shaft 53 the lever 52 to lower the rod 56 for actuating the record-releasing member 60.

After the record-reversing member 122 is swung in front of the magazine 35, as shown in Fig. 5, the pan 66 is pivoted to move a record from the turntable 21 to a position against the reversing member 122. Owing to the mounting and construction of the record-reversing member 122, the member 122 prevents a record placed against it from getting onto the record-supporting pins 41 and 42. This movement of the members 115, 116 and 117 is against the biasing action of the spring 120. After the pan 66 moves the record against the member 122, the pan 66 will gradually move back to a position below the turntable and the magazine 35 will be pivoted to assist in positioning the record in reversed position upon the turntable. As the magazine 35 pivots to assist in positioning the record in a reversed position upon the turntable, the magazine moves therewith the reversing member 122 which is positioned before it. This is possible because of the notch and lug connection between the shaft 124 and the stud 126.

After the record has been returned to the turntable in reversed position, the reversing member 122 is swung back to the position on the side of the magazine 35, as shown in Fig. 3. This is accomplished by the continued rotation of the cam wheel 50 which, by means of the cam surface 121, imparts a counterclockwise movement to the segmental gear 115 through the roller 119 and the levers 117 and 116. The counterclockwise movement of the segmental gear 115 rotates the pinion 123 and the shaft 124 in a clockwise direction to swing the reversing member 122 outwardly.

The counterclockwise movement of the segmental gear 115 also moves the finger 114 out of engagement with the screw 134. This allows the spring 136, which is under compression, to move the lever 52 and therewith the roller 55 back into the path of the cam 51 on the cam wheel 50 so that the lever 52 may again operate the record-releasing lever 60.

The counterclockwise movement of the segmental gear 115 causes a rounded end 137 of the finger 114 to move past an end 138 of the lever 112. Immediately thereafter, the biasing action of a spring 139 moves the lever 112 in a clockwise direction far enough to lock the finger 114 in the position shown in Fig. 8.

Figure 18:
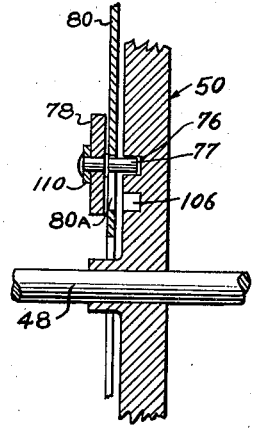
Fig. 18 is a sectional view on line 18—18 of Fig. 12.

When the reverse side of the record has been completely played, the movement of the pickup arm 28 actuates the tripping mechanism presently to be described, and starts the electric motor 47 for driving the shaft 49. The cam wheel 50, which is driven by the shaft 49, is thereby driven through a complete revolution. As the cam wheel 50 rotates, the cam surface 102 moves into engagement with the roller 97 to move the spring-biased lever 96 in a counterclockwise direction out of engagement with the plate 78. Immediately thereafter, the lower edge of the member 103, which is in engagement with the stop 107, moves into engagement with the pin 77. The continued movement of the member 103, while it is in engagement with the pin 77, moves the pin 77 from the groove 106 to the groove 76. As the pin 77 moves from the cam groove 106 to the cam groove 76, it moves therewith the plate 78 provided with the finger 110 in a counterclockwise direction (Figs. 12 and 18). The movement of the plate 78 and the pin 77 is relative to the beam 80 and is permitted by the provision of the slot 80A, previously described. The finger 110 in its movement with the plate 78 engages the spring-biased member 111 (Fig. 8) and moves it in a clockwise direction against the biasing action of the spring 111A without moving the lever 112. Thus the finger 110 moves back to the position shown in Fig. 8 during the beginning of a record-changing cycle without transmitting any motion to the lever 112. From this it is seen that during this record-changing cycle, the record-reversing member 122 remains in a locked position (Fig. 3) and the mechanism controlling the record-releasing member 60 remains in its operative position. As a heel 141 of the member 103 moves into engagement with the pin 77, the member 103 is pivoted on the axis 104 back to the position shown in Fig. 12. After the pin 77 enters the cam groove 76, the cam surface 102 moves out of engagement with the roller 97, and the spring 100 moves the lever 96 in a clockwise direction to move the hooked end 103 and the ear 104 into the locking relationship shown in Fig. 12.

When the stylus of the pickup arm reaches the end of a record on the turntable, the pickup arm is elevated and swung outwardly to a position not to interfere with a record-changing or record-reversing cycle. The pickup arm 28 is mounted on the pedestal 29 so that it can pivot in a vertical plane on two points at different times and so that it can be swung in a horizontal plane around the axis of the pedestal. The pedestal 29 is provided with a hollow rotatable shaft 142 in which a pin 143 is adapted to move vertically (Fig. 11). To the top of the shaft 142 is affixed a plate 144 which is adapted to move over the top of the pedestal 29 with the least possible friction. To one end of the plate 144, a plate 145 is connected by means of a pin 146. Intermediate its ends, the plate 145 is provided with a bearing portion 147 which supports by means of a pin 148 a bracket 149 fixedly secured to the pickup arm 28, as shown in Fig. 11. The pickup arm 28 is affixed to the bracket 149 so as to pivot on the bearing pin 148 when the stylus of the reproducer is in engagement with a record on the turntable. A suitable weight 149A is provided in the pickup arm 28. The weight 149A is located in the pickup arm opposite to the end in which the pickup is located. The weight 149A maintains a predetermined stylus pressure on a record on the turntable.

The pickup arm 28 is raised out of cooperative relationship with a record on the turntable by means of a portion 150 of a cam surface 151 on a cam wheel 152. Just before a record-changing or record-reversing cycle is initiated, the record-raising mechanism is in the position shown in Fig. 9. When the tripping mechanism to be described hereafter initiates a record-changing or record-reversing cycle, the shaft 48 and therewith the cam wheel 152 begin to rotate in a counterclockwise direction (Fig. 9). The portion 150 of cam surface 151 engages and raises the lower end of the pin 143. The upper end of the pin 143 engages and raises the plate 145. Screw 153 at the other end of the plate 145 engages the pickup arm 28 and raises it out of cooperative relationship with a record on the turntable.

After the pickup arm 28 has been raised, the cam wheel 152 has rotated to the position where an incline portion 154 of a cam surface 155 (Figs. 4 and 10) engages a pin 156 fixed to a lever 157 which is connected to the lower end of the shaft 142 to rotate therewith. The continued rotation of the cam wheel 152 moves the pin 156 and therewith the lever 157 outwardly in a horizontal plane. After the inclined portion 154 of the cam surface 155 has moved past the pin 156, the lever 157 has positioned the pickup arm 28 beyond the edge of the pan 66 (Fig. 1).

While the cam surface 155 is in engagement with the pin 156, a pin 158 is in engagement with the cam surface 59 (Fig. 10) of the cam wheel 152. The pin 158 is secured to the free end of a spring-biased lever 160 which is affixed to a rod 161. The rod 161 is mounted on the base plate 20 to move in a vertical direction. The contour of the cam surface 159 is shown in dotted lines in Fig. 9. Immediately after the pickup arm has been swung to its outwardmost position, the portion 163 of the cam surface 159 moves into engagement with the pin 158. This raises the pin 158, the rod 161 and the lever 164. The rod 161 is raised against the biasing action of the spring 165. Immediately after the lever 164 is raised, the pin 143 moves off of the portion 150 of cam surface 151. This allows the pickup arm to come into engagement with a pin 166 affixed to the free end of the lever 164. During the time the pickup arm is being lowered into engagement with the pin 166 and for a short time thereafter, the cam surface 167 (Fig. 10) is in engagement with the pin 158 which prevents the pickup arm from moving inwardly. Immediately after a record has been placed on the turntable, the notch 168 in the cam surface 167 (Fig. 10) allows the pin 158 which is under the biasing action of the spring 171, to move so that it transmits inward movement to the pickup arm. After the pin 158 is in engagement with the portion 168A of the notch 168, the pickup arm has been moved inwardly sufficiently far to position the stylus of the reproducer 27 over the outer groove of a ten-inch record on the turntable.

If a twelve-inch record is on the turntable 21, the pickup arm 28 will be swung inwardly until a fiber roller 169 on the lever 164 engages the peripheral edge of the twelve-inch record. This engagement positions the stylus of the reproducer over the outer groove of a twelve-inch record.

As the cam wheel 152 continues to rotate, a portion 170 of cam surface 159 moves under the pin 158. This allows the spring 165 to force downwardly the rod 161 and therewith the levers 160 and 164. The downward movement of the lever 165 positions the stylus of the reproducer 27 into engagement with the outer groove of a record on the turntable. After the stylus is in engagement with the outer groove of the record on the turntable, the continued movement of the cam surface 159 allows the pin 158 to move into the notch 162 of the cam surface 159 (Fig. 9). This allows the levers 160 and 164 to be lowered still further. The further lowering of the lever 164 moves the pin 166 out of engagement with the pickup arm 28. After the pin 166 is out of engagement with the pickup arm 28, a portion 168B of the notch 168 moves into engagement with the pin 158. The continued movement of the cam wheel 150 causes the pin 158 and the arm 160 to move in a counterclockwise direction (Fig. 10) against the biasing action of a spring 171 to the position shown in Fig. 10. When the pin 158 and lever 160 have been moved back to the latter position, the driving motor 47 for the record-changing apparatus is automatically shut off and reproduction of a record on the turntable is begun.

The automatic record-changing or record-reversing cycle is initiated by the automatic tripping mechanism, previously mentioned, which will now be described in greater detail. The pick-up arm 28 which has been lowered to engage the stylus with the outermost groove of a record on the turntable, is moved inwardly by the stylus following the spiral groove on the record.

Referring particularly to Fig. 13, the plate 144 is shown to have two fingers 175 and 176. As reproduction goes on and the pickup arm 28 moves toward the center of the record, the pickup arm moves with it the plate 144 in a clockwise direction (Fig. 13) and therewith the fingers 175 and 176. As the pickup arm approaches the end of the record, the finger 175 engages a turned-up end 177 of a lever 178 (Figs. 13 and 14) and moves the lever in a counterclockwise direction. This lever 178 moves a lever 179 by a frictional connection to be described hereafter. A spring-biased lever 180 is pivotally connected as at 181 to the free end of the lever 179 (Figs. 13 and 14).

The frictional connection between the levers 178 and 179 comprise a clutch mechanism constructed by placing the annular end portion of the lever 179 over a metallic washer 182 (Fig. 14). A fiber washer 183 is placed over the annular end portion of the lever 179. The annular end portion of the lever 178 is placed over the fiber washer 183. A spring washer 185 is placed over the annular end portion of the lever 178. A screw 184 connects together the members 182, 179, 183, 178 and 185. The screw 184 is so adapted that the desired frictional driving engagement between the levers 178 and 179 may be decreased or increased by moving the screw 184 up or down respectively.

As the stylus of the pickup 27 advances toward the center of the record, the levers 178, 179 and 180 are moved so that a fiber roller 186 on the spring-biased lever 180 moves into the path of movement of a lug 187 provided on a member 188. The member 188 is affixed to the underside of the turntable 21 and rotates therewith. With the roller 186 in the position to be engaged by the lug 187 each time the turntable is rotated one revolution, the lug 187 moves the roller 186 which in turn moves the levers 180 and 179 in a reverse direction. However, due to the frictional connection between the levers 178 and 179, the reverse movement of the lever 179 is not transmitted to the lever 178. When the stylus moves into a tripping groove at the end of a record, the lever 179 is moved inwardly fast enough during one revolution of the turntable 21 to move a hooked end 189 of the lever 180 into the path of the lug 187. The engagement of the lug 187 with the hooked end 189 of the lever 180 causes the lever 180 to move in a counterclockwise direction against the biasing action of a spring 190 to cause the tapered end 191 of the lever 180 to engage the upper end of a lever 192 which moves in a slot 193 provided in the base plate 20, and moves the lever 192 (Figs. 13 and 15) in a clockwise direction (Fig. 15) against the biasing action of a spring (Fig. 15) 194. This lever 192 is pivotally mounted as at 195 on a bracket 196 depending from the underside of the base plate 20.

The movement of the lever 192 (Fig. 15), causes the lower end of the lever (Fig. 15) to engage and move a spring-biased member 197 (Figs. 15 and 16) in a clockwise direction (Fig. 16) about its axis 198 on a lever 199 which is fixedly secured to the shaft 49 (Figs. 4 and 16). As shown in Fig. 15, the upper end of the member 197 engages an ear 200 on a lever 201 which supports a mercury switch 202. The engagement of the elements 197 and 200 maintains the lever 201 in the solid line position of Fig. 15, whereas when the member 197 is moved as previously described, the member 197 and the ear 200 disengage, permitting the lever 201 to drop to the dotted line position into engagement with a stop 203 (Fig. 15) wherein the switch 202 is closed and the driving motor 47 is started. Immediately after the mechanism is started, as described above, the spring 190 moves the lever 180 back to the position shown in Fig. 13, into engagement with an ear 204 provided on the lever 179. This movement of the lever 180 permits a spring 205 to return the member 197 to its normal position shown in Fig. 16.

Immediately after the tripping mechanism is actuated, the cam 152 rotates with the shaft 48 to swing the pickup arm 28 outwardly. As the pickup arm swings outwardly, the finger 176 of the plate 146 (Fig. 13) engages the upturned end 177 of the lever 178 to move the spring-biased lever 180 out of the path of the lug 187 of the member 188 (Fig. 13).

Just before the shaft 48 has completed its cycle of operation, the lever 199, which rotates with the shaft 49, moves the member 197 into engagement with the ear 200 and moves the lever 201 in a clockwise direction to the position shown in Fig. 14. When this occurs the mercury switch 202 opens the electric circuit to the motor 47 and stops it.

As an additional feature, the mechanism may be set manually to play only one side of a record before returning the record to the magazine. To accomplish this, there is provided an L-shaped lever 206 (Figs. 1 and 3). An upturned end 207 of the lever 206 which extends upwardly through the base plate 20 is biased by a spring 208 (Fig. 13) into engagement with one of a pair of notches, 209 and 210 provided in an escutcheon 211 which is properly labelled as shown in Fig. 1 to show the operator when the lever 206 is set so that the mechanism will play one side of a record before returning it to the magazine, and when the mechanism is set to play both sides of a record before returning it to the magazine.

When the upturned end 207 of the lever 206 is set in the notch 209 (Fig. 1) the mechanism is set so that the lower end of a lever 212 (Fig. 12) which is secured to the L-shaped lever 206 (Figs. 3 and 12), is held out of the path of movement of an ear 213 provided on a lever 214. The lever 214 is pivotally mounted on the beam 80 at 215. With the levers 212 and 214 positioned not to engage with each other, the record-changing apparatus will not return a record to the magazine 35 until both sides of the record have been played.

When the upturned end 207 of the lever 206 is manually moved into engagement with the notch 210 of the escutcheon 211 (Fig. 1), the lever 212 (Fig. 12) is moved in a clockwise direction sufficiently far to engage and move the lever 214. The lever 214 is moved against the biasing action of a spring 216. A lever 217, which moves in unison with an lever 214, moves over the element 218 provided on the beam 88 to reciprocate relative thereto. The movement of the lever 217 over the element 218 depresses the element 218 far enough so that when the toe 105 (as positioned in Fig. 12) moves toward it a protruding portion 105A thereon engages it. The element 218 is not, however, depressed far enough to engage the walls of the groove 106.

With the pin 218 in the depressed position as a result of having moved the pin 207 into notch 210 and the rest of the mechanism which cooperates with cam wheel 50 in the position shown in Fig. 12, the rotation of the cam wheel 50 will cause the protrusion 105A to move into engagement with the pin 218. It is to be noted that when the member 103 rests against the stop 107, the pin 218 will not engage the protrusion 105A to move the member 103. The engagement of the protrusion 105A and the pin 218 and the continual rotation of the cam wheel 50 will cause the member 103 to pivot so that it rests against the stop 107. The member 103 is moved against the stop 107 before it moves into engagement with the pin 77 so that pin 77 will follow groove 76 and a new record will be moved to the turntable. During each succeeding cycle of the cam wheel 50 with the pin 77 in engagement with the notch 210 a new record will be moved to the turntable.

The record-changing apparatus described may be used with a radio-phonograph combination. One method of connecting the record-changing apparatus in a radio-phonograph combination is by connecting a three-way switch 220 to a lead 221, the other end of which is connected to a power supply. The switch 220 includes a movable contact 222 and fixed contacts 223 and 224. When the movable contact 222 engages contact 223, a circuit is closed for operating the phonograph. When the movable contact 222 engages a contact 224, a circuit is closed for operating the radio. The phonograph-radio combination is shut off when the movable contact 222 is in engagement with the point 225.

The phonograph contact 223 is connected to the mercury switch 202 by leads 226 and 227. The mercury switch 202 is connected to the turntable motor 25 by leads 227 and 228 and to the record-changing motor 47 by a lead 229. The motors 25 and 47 are also connected to a lead 230 which is the other lead to the power supply.

The mercury switch 202 is also connected directly to the lead 221 by a lead 231 without passing through the switch 220. The purpose of this connection is to keep the circuits to the motors 25 and 47 closed after the movable contact 222 is moved out of engagement with a phonograph contact 223, until the mercury switch 202 automatically opens these motor circuits. Thus when the movable contact 222 is moved out of engagement with the phonograph contact 223 during a record-changing cycle, the record-changing cycle will always continue to completion before the motors 25 and 47 are shut off.

In order that a record-changing cycle may be initiated before a record on the turntable is completely played, a reject switch 231 is connected to the lead 228 and to the lead 229, as shown in Fig. 17. When the reject switch 231 is closed, an electrical circuit to the motor 47 is closed and the motor is started for a record-changing or a record-reversing cycle. It is to be noted that in the wiring arrangement shown in Fig. 17, the reject switch 231 can close the circuit to the motor 47 only when the movable contact 222 is in engagement with the phonograph contact 223.

When the movable contact 222 is moved out of engagement with contact 223 and into engagement with either the contact 224 or 225 during the time when a record is being reproduced by the phonograph, the motors 25 and 47 will be shut off immediately since the circuit through the mercury switch is open.

The general mode of operation of the record-changing apparatus will now be described. For this mode of operation it is assumed that the lever 206 (Fig. 1) is in the notch 209, a stack of records has been placed in the magazine 36, a ten-inch record has been placed on the turntable 21 and the pickup arm 22 has been placed in the outer groove of the record on the turntable. Upon moving the contact 222 in engagement with the phonograph contact 223, the turntable motor 25 will be started and the reproduction of a record on the turntable will take place.

When the pickup arm reaches the tripping groove, the tripping mechanism including the plate 144, the levers 178, 179, 180 and 192 (Figs. 13, 14 and 15) is actuated, whereby the member 197 (Figs. 15 and 16) is moved out of engagement with the lever 201 to move the mercury switch 202 so that a circuit to the motor 47 is closed and the motor is started to drive the shaft 48.

As the cam wheel 152 rotates with the shaft 48, it moves the cam surface 150 into engagement with the pin 143 (Fig. 9) to raise the pin 143 (Fig. 11). This movement of the pin 143 raises the pickup arm 28 and the stylus of the reproducer 27 out of engagement with the record on the turntable. The continued movement of the cam wheel 152 causes the cam surface 155 (Fig. 10) to move the pin 156 outwardly so that the pickup arm 28 is moved to its outwardmost position.

At this time the cam wheel 50, which is also rotating with the shaft 48, has moved to a position where the cam surface 102 thereon engages with the roller 97 to unlock the plate 78. Immediately thereafter the member 103 (Fig. 12) which is connected to the cam wheel 50, engages and moves the pin 77. The pin 77 moves therewith the plate 78 and the finger 110 so that both the plate and the finger move in a clockwise direction (Fig. 12). The clockwise movement of the finger 110 moves the lever 112 in a counterclockwise direction (Fig. 8) thereby disengaging the lever 112 from locking engagement with the finger 114.

Shortly thereafter the roller 119, which is in engagement with the cam surface 121 on the cam wheel 50, moves in a counterclockwise direction (Fig. 8). This allows the segmental gear 115 and the lever 117 to rotate in a clockwise direction (Fig. 8). As the segmental gear 115 thus rotates, the finger 114 affixed thereto moves the lever 133 in a counterclockwise direction (Fig. 8). The counterclockwise movement of the lever 134 moves the lever 52 and the roller 55 affixed thereto out of the path of the cam surface 51 of the cam wheel 50. The clockwise rotation of the segmental gear 115 also drives the pinion 123 of the shaft 124 affixed thereto in a counterclockwise direction. The counterclockwise movement of the shaft 124 swings the reversing member 122 from the position shown in Fig. 3 to the position in front of the magazine shown in Fig. 5.

The continued movement of the cam wheel 50 moves the beam 69 upwardly (Fig. 2) which through the lever 71, the shaft 53 and the segmental gear 72, moves the pan 66 upwardly to carry the record from the turntable 21 to a position against the reversing member 122. Thereafter, as the beam 69 moves downwardly, the pan 66 pivots back and serves as a guide for the record resting against the reversing member 122 as it slides back on the turntable in reversed position. As the pan 66 is moving downwardly, the beam 80, whose movement is controlled by the cam groove 106 in the cam wheel 50, moves the magazine 35 in a counterclockwise direction (Fig. 2). In thus moving, the magazine 35 cooperates with the pan 66 in returning the record to the turntable in reversed position.

After the record is on the table in reversed position, the cam surface 121 on the cam wheel 50 engages the roller 119 to move the lever 117 and the segmental gear 115 in a counterclockwise direction (Fig. 8). The counterclockwise rotation of the gear 115 rotates the pinion gear 123 and the shaft 124 affixed thereto in a clockwise direction. The clockwise rotation of the shaft 124 returns the reversing member 122 to the position shown in Fig. 3. The counterclockwise movement of the segmental gear 115 also moves the finger 114 out of engagement with the arm 134 thus permitting the spring 136, which is under compression, to move the lever 52 and the roller 55 affixed thereto to an operative position with the cam surface 51 of the cam wheel 50.

Shortly thereafter, the cam surface 167 on the rotating cam 152 allows the pin 158, which is under the biasing action of the spring 171, to enter the notch 168. The movement of the pin 158 moves the arm 164 so that the pickup arm 28, which is in engagement with the pin 166 on the end of the arm 164, moves inwardly over the outer groove of the record on the turntable. Thereafter, the portion 170 of the cam surface 159 of the cam wheel 152 allows the pin 158 to move downwardly. The downward movement of the pin 158 allows the arm 164 to move downwardly which in turn permits the stylus of the reproducer to engage the outer groove of the record. The continued movement of the cam wheel 152 allows the pin 158 to enter the notch 162 in the cam surface 159. This lowers the arm 164 out of engagement with the pickup arm 28. After the arm 164 is lowered out of engagement with the pickup arm 28, it is swung outwardly as the notch 168 of the cam surface 167 moves out of engagement with the pin 158.

By this time, the cam surface 121 on the cam wheel 50 allows the finger 114 through levers 118 and 117 to move past the hooked end 138 of the lever 112 and to be locked by the lever 112 as shown in Fig. 8.

Thereafter the member 197 affixed to one end of the lever 199, the other end of which is fixed to shaft 48 to rotate therewith, moves the lever 201 which supports the mercury switch 202 to the full line position shown in Fig. 15. With the lever 201 and the mercury switch 202 in this position, the circuit to the motor 47 is open and the motor shuts off.

Reproduction of the reversed record thereafter takes place. When the stylus reaches the tripping groove, the tripping mechanism is actuated and the circuit to the record-changing motor 47 is closed. This motor drives the shaft 48 for a record-changing cycle.

The first operation during the record-changing cycle is to move the pickup arm 28 to its outward-most position shown in Fig. 5. This operation already has been described. Thereafter, the record on the turntable 21 is moved back to the magazine 35. This operation is accomplished by the rotation of the cam wheel 50 which transmits motion to the beam 69 to pivot the pan 66 upwardly toward the magazine 35. In its upward movement, the pan 66 carries the record on the turntable to the magazine.

After the played record is deposited in the magazine the cam 51 of the cam wheel 50 moves the lever 52 on its axis 53 to move the rod 56 downwardly. The downward movement of the rod 56 moves lever 60 to release the rear record from the magazine 35. (In this mode of operation it is assumed that the released record is a ten-inch record.) The released record drops so that the lower edge rests on the cushioning pads 63.

The continued rotation of the cam wheel 50 moves the beam 69 upwardly which through the lever 71, the shaft 53 and the segmental gear 72, moves the pan 66 downwardly. While the pan 66 moves downwardly, the extension 74 thereon moves upwardly between the pads 63 to lift the released record off of the pads 63 and positions the record so that it may be guided to the turntable.

The continued movement of the cam wheel 50 moves the beam 80 upwardly. The upward movement of the beam 80 through the levers 83 and 87 moves the magazine in a clockwise direction (Fig. 2). The clockwise movement of the magazine 35 allows it to cooperate with the pan 66 to slide the released record along the turntable 21. After the magazine 35 has moved a predetermined distance in a clockwise direction, the cam wheel 50 reverses the direction of movement of the beam 80 so that the magazine 35 swings in a counterclockwise direction to the position shown by full lines in Fig. 2. The counterclockwise movement of the magazine 35 allows the released record to drop into playing position upon the turntable 21. After the released record is on the turntable, the cam wheel 152 is rotated to a position where the notch 168 in the cam surface 167 allows the spring-biased pin 158 to move therein. The movement of the pin 158 transmits inward movement to the arm 164 which moves therewith the pickup arm 28 to the outer groove of the record on the turntable.

Immediately thereafter, the portion 170 of the cam surface 159 allows the pin 158 to move downwardly. The downward movement of the pin 158 transmits downward motion to the arm 164 which allows the stylus of the reproducer to engage the outer groove of the record on the turntable. As the notch 162 moves into engagement with the pin 158, the arm 164 is lowered still further. Thereafter, the movement of the cam surface 167 forces the pin 158 out of the notch 168. This movement of the pin 158 swings the arm 164 outwardly to the position shown in Fig. 1. By this time the member 197 of the lever 199 moves the mercury switch to the full line position shown in Fig. 15 to open the circuit to the motor 47 and shut off the operation of the record-changing apparatus.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member connected to said connecting means for engaging with said first guiding means to move said magazine said first distance and for engaging said second guiding means to move said magazine said second distance, said member being movable between each of said movements of said magazine for changing its engagement with said first and second guiding means; and a switching element on said driving means and associated with said first and second guiding means for moving said member during each cycle of operation of said driving means for changing the engagement of said member with said first and second guiding means.

2. In an automatic record-changing apparatus, the combination comprising a magazine movable first and second distances at different times; driving means movable through a cycle of operation for each of said movements of said magazine; first and second guiding means on said driving means having a common portion; connecting means operatively associated with said magazine; a member movably connected to said connecting means and associated with said guiding means for cooperating with said first guiding means to move said magazine said first distance, for cooperating with said second guiding means to move said magazine said second distance and for cooperating with said common portion between each of said movements of said magazine; and a switching element associated with said common portion on said driving means for moving said movable member while it is in cooperative relationship with said common portion for changing its cooperative relationship with said first and second guiding means.

3. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member movably connected to said connecting means for engaging said first guiding means to move said magazine said first distance and for engaging said second guiding means to move said magazine said second distance; means associated with said connecting means for locking said member against movement relative to said connecting means while said magazine is being moved; means on said driving means for engaging said locking means after each movement of said magazine to unlock said movable member; and a switching element on said driving means and associated with said first and second guiding means for moving said movable member while it is unlocked for changing its engagement with said first and second guiding means.

4. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member movably connected to said connecting means for engaging said first guiding means to move said magazine said first distance and for engaging said second guiding means to move said magazine said second distance; resilient means associated with said connecting means for locking said member against movement relative to said connecting means while said magazine is being moved; means on said driving means for moving said resilient means out of engagement with said movable member after each movement of said magazine; and a switching element on said driving means and associated with said first and second guiding means for moving said movable member while it is unlocked for changing its engagement with said first and second guiding means.

5. In an automatic record-changing apparatus, the combination comprising a magazine movable first and second distances at different times; driving means movable through a cycle of operation for each of said movements of said magazine; first and second guiding means on said driving means; connecting means operatively associated with said magazine; a member connected to said connecting means for engaging said first guiding means to move said magazine said first distance and for engaging said second guiding means to move said magazine said second distance, said member being movable between each of said movements of said magazine for changing its cooperative relationship with said first and second guiding means; a switching element on said driving means and associated with said first and second guiding means for moving said member during each cycle of operation of said driving means for changing the engagement of said member with said first and second guiding means, said switching element being movable relative to said first and second guiding means by said member after its engagement with said first and second guiding means has been changed by said switching element; and means adapted to be moved manually into the path of said switching element when it is in position to move said member into engagement with said first guiding means for moving said switching element relative to said first and second guiding means whereby said member will remain in engagement with said second guiding means during successive cycles of said driving means.

6. In an automatic record-changing apparatus, the combination comprising a magazine movable first and second distances at different times; driving means movable through a cycle of operation for each of said movements of said magazine; first and second guiding means on said driving means having a common portion; connecting means operatively associated with said magazine; a member movably connected to said connecting means and associated with said guiding means for cooperating with said first guiding means to move said magazine said first distance, for cooperating with said second guiding means to move said magazine said second distance and for cooperating with said common portion between each of said movements of said magazine; a switching element associated with said common portion on said driving means for moving said movable member while it is in cooperative relationship with said common portion for changing its cooperative relationship with said first and second guiding means; and means on said driving means for engaging said connecting means and guiding it while said movable member is in cooperative relationship with said common portion.

7. In an automatic phonograph having a turntable, the combination comprising a driving means for carrying out a record-changing cycle and a record-reversing cycle; first and second guiding means on said driving means; a movable magazine for supporting a plurality of records, said magazine being movable a first distance during said record-changing cycle and a second distance during said record-reversing cycle; connecting means operatively associated with said magazine; a member connected to said connecting means for engaging said first guiding means to move said magazine said first distance and for engaging said second guiding means to move said magazine said second distance, said member being movable between each of said movements of said magazine for changing its engagement with said first and second guiding means; a switching element on said driving means and associated with said first and second guiding means for moving said member during each cycle of operation of said driving means for changing the engagement of said member with said first and second guiding means; record-releasing means movable by said driving means for releasing a record from said magazine, said record-releasing means being adapted to be moved out of operative position with said driving means; an oscillatory member movable by said driving means for guiding a record during said record-changing cycle and said record-reversing cycle; record-reversing means movable into an operative position for cooperating with said magazine and said oscillatory member for reversing a record on said turntable; resilient means associated with said driving means for moving said record-reversing means into its operative position and for moving said record-releasing means out of operative position with said driving means; and locking means normally in locking engagement with said resilient means, said locking means being adapted to be moved out of said locking engagement by said member as it is moved out of engagement with said first guiding means and into engagement with said second guiding means.

8. In an automatic phonograph having a turntable, the combination comprising a driving means for carrying out a record-changing cycle and a record-reversing cycle; first and second guiding means on said driving means having a common portion; a movable magazine for supporting a plurality of records, said magazine being movable a first distance during said record-changing cycle and a second distance during said record-reversing cycle; connecting means operatively associated with said magazine; a member movably connected to said connecting means and associated with said guiding means for cooperating with said first guiding means to move said magazine said first distance, for cooperating with said second guiding means to move said magazine said second distance and for cooperating with said common portion between each of said movements of said magazine; a switching element associated with said common portion on said driving means for moving said movable member while it is in cooperative relationship with said common portion for changing its cooperative relationship with said first and second guiding means; record-releasing means movable by said driving means for releasing a record from said magazine, said record-releasing means being adapted to be moved out of operative position with said driving means; an oscillatory member movable by said driving means for guiding a record during said record-changing cycle and said record-reversing cycle; record-reversing means movable into an operative position for cooperating with said magazine and said oscillatory member for reversing a record on said turntable; resilient means associated with said driving means for moving said record-reversing means into its operative position and for moving said record-releasing means out of operative position with said driving means; locking means normally in locking engagement with said resilient means, said locking means being adapted to be moved out of said locking engagement by said member as it is moved out of engagement with said first guiding means and into engagement with said second guiding means; and means adapted to be moved manually into the path of said switching element when it is in position to move said member into cooperative relationship with said first guiding means for moving said switching element relative to said first and second guiding means whereby said member will remain in cooperative relationship with said second guiding means during successive cycles of said driving means.

9. In an automatic record-changing apparatus, the combination comprising a record-handling device having means for supporting a record and movable first and second distances at different times; driving means movable through a cycle of operation for each of said movements of said record-handling device; first and second guiding means on said driving means having a common section; connecting means operatively associated with said record-handling device; a member on said connecting means associated with said driving means for engaging said first guiding means to move said record-handling device said first distance and for engaging said second guiding means to move said record-handling device said second distance; and a switching element pivoted, at the junction of the first and second guiding means with said common section, on said driving means and formed to have a switching portion projecting into said common section and a heel portion adapted to project into one or the other of said guiding means whereby during one cycle of operation of said driving means, said switching portion guides said member into one of said guiding means and said member adjusts said switching element into position to guide said member into the other of said guiding means during the next cycle of operation of said driving means.

JACKSON H. PRESSLEY.